Nov. 2, 1954     J. F. QUEREAU ET AL     2,693,559
BALANCE INDICATOR FOR REBALANCEABLE SYSTEMS
Filed May 21, 1951                                     4 Sheets-Sheet 1
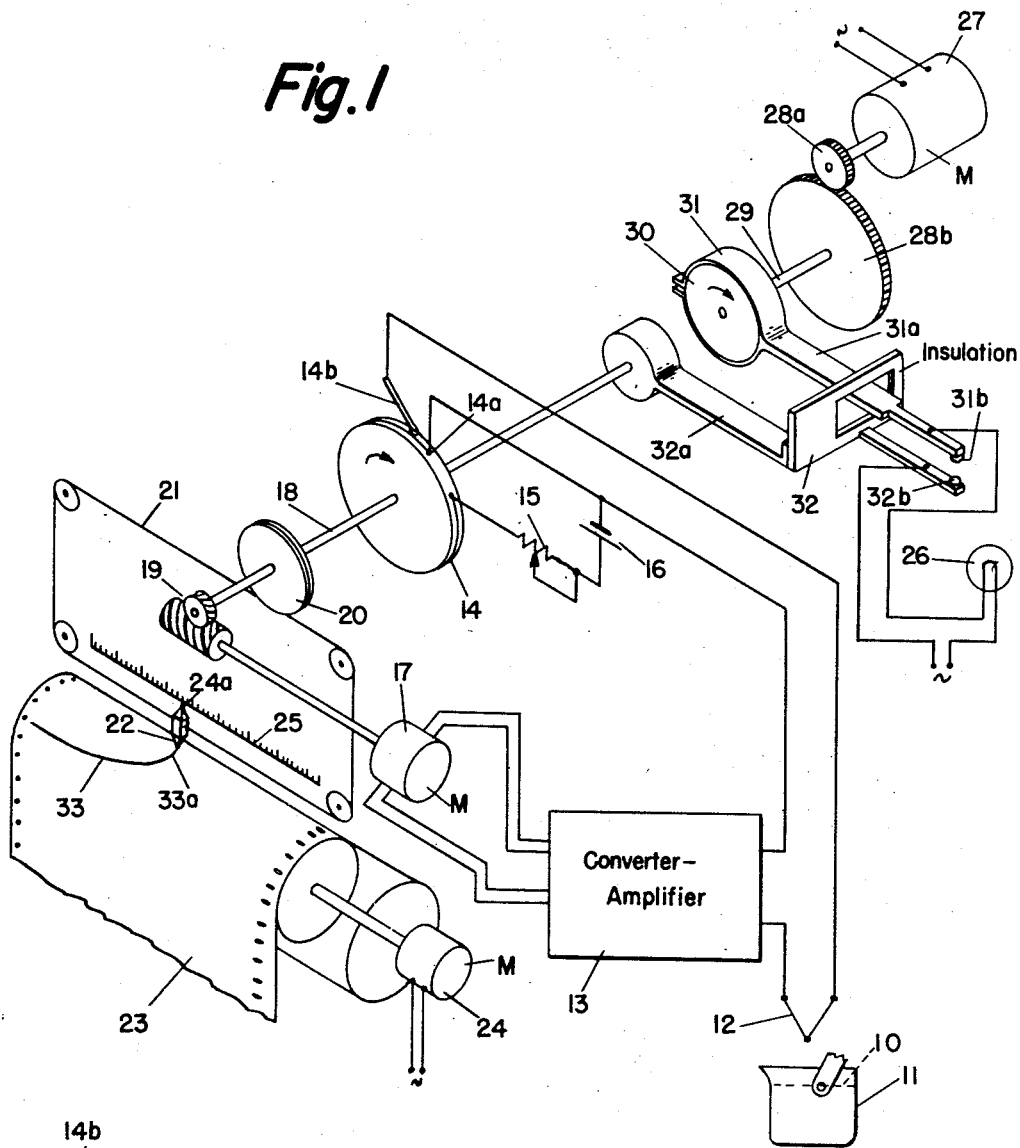
*Fig.1*
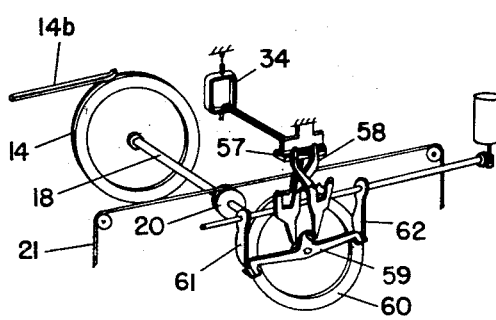
*Fig.1-A*
INVENTORS.
JOHN F. QUEREAU
EUGENE E. PEARSON
BY
*Woodcock and Phelan*
ATTORNEYS Nov. 2, 1954 J. F. QUEREAU ET AL 2,693,559
BALANCE INDICATOR FOR REBALANCEABLE SYSTEMS
Filed May 21, 1951 4 Sheets-Sheet 2

INVENTORS.
JOHN F. QUEREAU
BY EUGENE E. PEARSON

Woodcock and Phelan
ATTORNEYS

Nov. 2, 1954  J. F. QUEREAU ET AL  2,693,559
BALANCE INDICATOR FOR REBALANCEABLE SYSTEMS
Filed May 21, 1951  4 Sheets-Sheet 4

INVENTORS.
JOHN F. QUEREAU
EUGENE E. PEARSON
BY
Woodcock and Phelan
ATTORNEYS

United States Patent Office 2,693,559
Patented Nov. 2, 1954

2,693,559

BALANCE INDICATOR FOR REBALANCEABLE SYSTEMS

John F. Quereau, Wyncote, and Eugene E. Pearson, Philadelphia, Pa., assignors to Leeds and Northrop Company, Philadelphia, Pa., a corporation of Pennsylvania Application May 21, 1951, Serial No. 227,298

6 Claims. (Cl. 318—29)

This invention relates to measuring apparatus and has for an object the provision of simple, rugged and reliable means for indicating when substantial balance of a measuring network is attained.

In the measurement of molten metal and the like the life of thermocouples immersed in the molten metal is greatly shortened. The life of the thermocouple may be greatly lengthened if it be maintained in the molten metal for the minimum length of time necessary for the measurement of the temperature thereof; that is to say, a great many more measurements may be made if the immersion time of the thermocouple for each measurement be decreased. It will be apparent that if accurate measurement of the temperature of the molten metal is to be attained, an operator will of necessity immerse the thermocouple in the metal bath and leave it there until he is certain the automatically operating potentiometric measuring apparatus has attained balance corresponding with the temperature of the molten bath. Thus, the operator will be required to immerse the thermocouple and observe the operation of the recording apparatus in order to ascertain when the measurement is completed or it will be necessary for him to permit the lapse of sufficient time to know from past experience that the measurement is complete. The latter procedure is more often utilized since the operator's attention must be primarily directed to holding the thermocouple in the molten bath rather than at the same time be observing the movement of the pen. The net result has been that the thermocouples have been immersed over periods of time much greater than necessary for the measurement of the temperature.

In accordance with the present invention, signaling means are provided which at all times indicate to the operator the operation of the recording apparatus and particularly signal when the measurement of the temperature is substantially complete and when the operator may properly remove the thermocouple from the bath. In practice the result has been a substantial increase in the number of times a thermocouple may be used for the measurement of temperatures under the adverse conditions imposed by the molten steel.

More particularly, in carrying out the invention in one form thereof, a signaling or control element is rotated at a selected constant speed. Provisions are made for a second control element to close a circuit so long as the potentiometric apparatus is moving toward a balancing or final measuring position. In the operation towards balancing position the speed is relatively high. As the thermocouple approaches its final temperature the speed of the system-balancing element decreases. When the speed of that element has decreased below that of the control member moving at constant speed, a control circuit is energized to signal that the thermocouple may then be removed from the molten metal bath.

For further objects and advantages of the invention and for a more detailed explanation thereof, reference is to be had to the following description taken in conjunction with the accompanying drawings, in which:

Fig. 1 diagrammatically illustrates in exploded perspective one embodiment of the invention;

Fig. 1-A is a perspective view showing diagrammatically the principal features of a mechanical relay of the type which can be used with systems embodying the invention;

Figure 2:
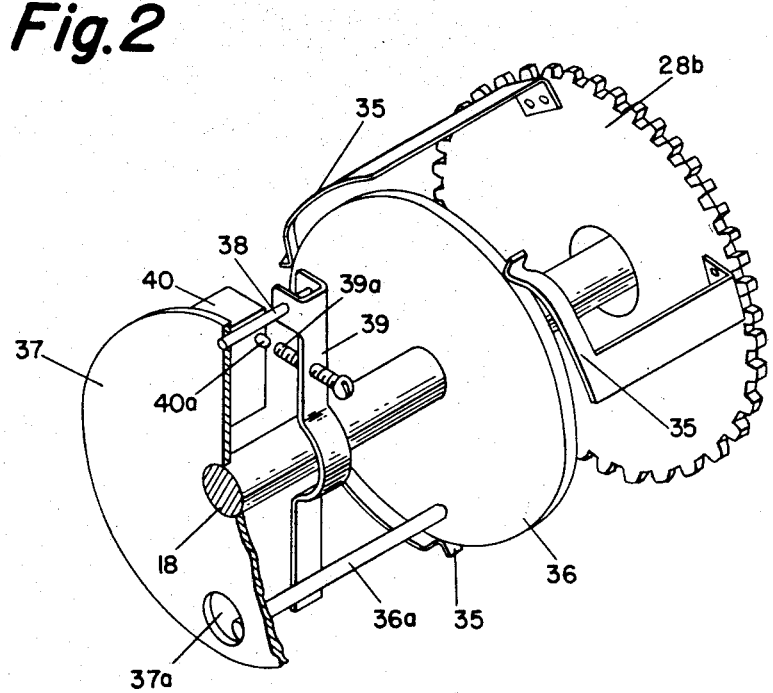
Figs. 2 and 3 illustrate in exploded views a further embodiment which may be employed in accordance with the invention with the parts in different positions.

Referring to Fig. 1, the invention in one form has been illustrated as applied to the measurement of the temperature of a molten bath of steel 10 within a pouring ladle 11 as by a thermocouple 12 suitably supported for immersion in the molten steel 10. The thermocouple 12 produces an electromotive force of magnitude which varies with change in temperature of the molten bath 10. The magnitude of the voltage or electromotive force produced by the thermocouple 12 may be measured by any suitable apparatus, such for example, as a converter-amplifier 13 in conjunction with an adjustable potentiometer comprising a variable resistor or slidewire 14 connected in series with a rheostat 15 across a power supply shown as a battery 16. A motor 17, rotation of which is controlled by unbalance between the voltage of thermocouple 12 and that developed between one end 14a of slidewire 14 and a contact 14b, controls rotation of the slidewire shaft 18. The action is such that as the temperature of the thermocouple 12 changes upon immersion in the molten bath 10, the motor 17 is energized in a direction to drive through gearing 19 the shaft 18 to maintain the potential difference between contacts 14a and 14b approximately equal and opposite to the voltage developed by the thermocouple 12. Balancing systems of the type briefly explained are well known to those skilled in the art. The converter-amplifier may be of the type disclosed in Williams Patent Nos. 2,113,164 and 2,367,746.

As the slidewire 14 is adjusted my motor 17, a pulley 20 through a belt, known in the art as a "violin string," 21 serves to position a pen 22 relative to a chart 23 which is driven at constant speed by a motor 24. The pen 22 may have associated with it an index 24a movable relative to a scale 25. Both the scale and the chart are suitably calibrated as in terms of temperature.

As has already been explained, the number of times a thermocouple may be immersed into a molten bath, such as molten steel, depends upon the overall time of each immersion of the thermocouple. Therefore, by minimizing the time the thermocouple remains in the molten bath 10 for each measurement of temperature, a greater number of measurements may be made before the thermocouple 12 will have to be replaced. In order to avoid leaving the thermocouple 12 within the molten bath 10 beyond the minimum time required for the measurement of temperature, provisions are made to signal the operator that the end of the period of rising temperature of thermocouple 12 is approaching and, hence, that the thermocouple 12 at that time has reached a temperature approximately that of the molten bath 10. Advantage is taken of the fact that the slidewire shaft 18 is on the average rotated at a rate which corresponds with the rate of change of temperature of thermocouple 12. Hence, when that rate of change drops below a predetermined value, a signal is given to the operator, as by energization of a signal lamp 26, that the measuring system is then recording on the chart 23 within acceptable limits the temperature of the bath 10. Thus, the operator can immediately withdraw the thermocouple 12 from the bath.

With the foregoing understanding of the principles of the invention, it will, of course, be understood it is applicable to many applications in which the life of the condition-responsive element is limited by reason of its contact with the object or material whose temperature is to be measured, and in any application in which the time of exposure to the temperature is to be maintained at an absolute minimum. Thus, while temperature alone may shorten the life of some thermocouples, the chemical action is also of importance in shortening the life, and in accordance with the present invention maximum use of a particular thermocouple is attained and a life greater than has therefore been possible in the usual manner in which temperatures of molten metal baths have been measured.

In Fig. 1 the foregoing operation is accomplished by means of a motor 27 operating at substantially constant speed, driving through gears 28a and 28b a shaft 29 carrying a drum or rotatable friction element 30. A cooperating friction element 31 has an arm 31a which carries an electrical contact 31b disposed in cooperative relation with an electrical contact 32b. As shown by the arrow, the friction element 30 is driven in a clockwise direction, and thus tends to rotate the arm 31a in a clockwise direction. The speed of movement of elements 30 and 31 is relatively low and is selected to be of that order which represents substantial attainment by thermocouple 12 of its final temperature. A signaling circuit for the lamp 26 is not completed as a result of the operations just described for the reason that a driving member 32 formed of electrically insulating material and carried by an arm 32a secured to the shaft 18 is, immediately upon the immersion of thermocouple 12 in the molten bath 10, rotated by it in a clockwise direction at a speed much greater than that of shaft 29. Accordingly, and by reason of the over-drive provided through elements 30 and 31, so long as the speed of shaft 18 exceeds that of shaft 29, the contacts 31b and 32b are spaced one from the other a distance determined by the height of the slot in the driving member 32.

It will now be assumed that the thermocouple 12 has been lowered into the molten bath 10 and that the motor 17 has been energized in a direction to rotate the shaft 18 in a clockwise direction, driving the pen 22 from a position adjacent the left-hand edge of the chart toward the right-hand edge. Since the chart 23 is moving downwardly, as viewed in Fig. 1, a line 33 on the chart slopes upwardly as indicated. As the thermocouple 12 approaches the temperature of bath 10, the direction of line 33 changes, indicating the slowing down of motor 17. Of course, when it comes to a standstill, a straight line will be drawn running lengthwise of chart 23. Accordingly, in the region 33a of line 33 the speed of motor 17 will be such that the speed of shaft 18 will be less than that of the drum 30 and arm 31a, and the contact 31b will then move toward contact 32b. As it engages contact 32b, the pen 22, moving at slower and slower speed, will be approximately at standstill. The signal lamp 26 is thereupon energized. The operator sees the signal lamp and immediately withdraws thermocouple 12 from the bath 10. By the time this is done the pen 22 is at standstill, a record of the temperature of bath 10 having been recorded on chart 23, and yet the thermocouple 12 will have remained in the molten bath for only that length of time required for it to attain the final temperature thereof. In practice the present invention has extended the usefulness of the thermocouple in terms of the number of temperature measurements which may be made before need of replacement.

The device for controlling signaling circuits, one of which has been shown in Fig. 1, may take several forms, it being understood, of course, that instead of lighting signal lamps audible signaling means may be utilized or, of course, the thermocouple may be mechanically moved into and withdrawn from the molten bath in response to the operation of contacts 31b and 32b. These contacts may be opened upon attainment of balance, the system of Fig. 5 being exemplary of this suggested modification. In Fig. 1, by interchanging arms 31a and 32a, the contacts will be opened upon attainment of balance.

Figure 3:
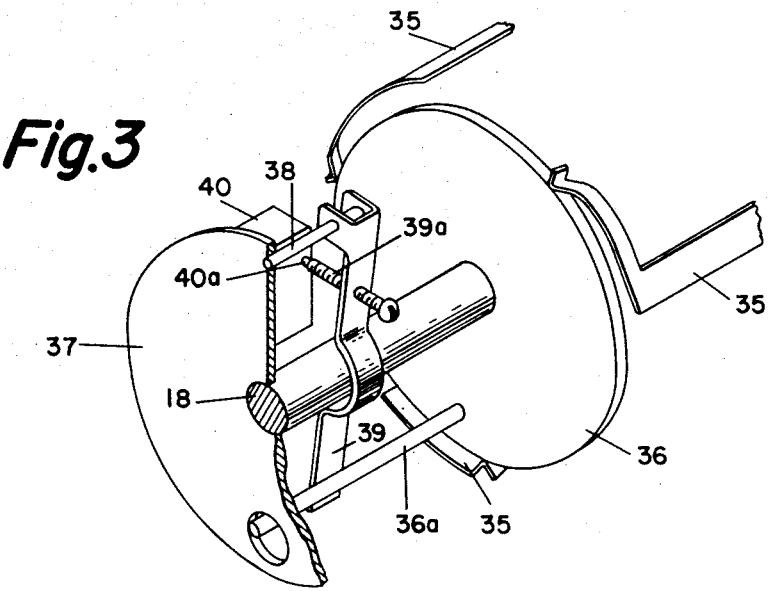

In Figs. 2 and 3 the gear 28b is driven by a motor (not shown) in the same manner as in Fig. 1 and frictionally drives, as by means of clips or friction arms 35, a friction disc 36 having an arm 36a extending therefrom and into an opening 37a of a disc 37 secured to the slidewire shaft 18. When the disc 37 is driven in a clockwise direction by slidewire shaft 18 it carries with it a pin 38 and one end of an arm 39 carried by pin 38, the opposite end thereof extending behind the arm 36a. The action is such that an adjustable element 39a is moved away from a plunger 40a of a switch 40 which may be of the type sold under the trade-name "Micro-switch," though any type of switch operable by a plunger 40a will be suitable. Thus, as long as the disc 37 is moving at a speed exceeding that of disc 36, the element 39a will be spaced from plunger 40a, or at least will not be applying a switch-actuating force thereto.

However, as the temperature of the thermocouple approaches that of the body to which it is subjected, the speed of disc 37 will decrease below that of disc 36 and, hence, the arm 36a will move the lower end of arm 39 in a clockwise direction about its pivot 38 to move the element 39a against plunger 40a, Fig. 3, and actuate the switch 40. The actuation of switch 40 either signals or effectuates the lifting of the thermocouple from the molten bath. It will be observed that the size of the opening 37a may be varied to determine the limits of movement of the arm 39. By varying the position of the switch-actuating element 39a with respect to the plunger 40a, the extent of movement of disc 36 necessary to operate the switch 40 from one circuit-controlling position to the other can be varied as desired. The adjustability feature just described is particularly useful in connection with a modified form of the apparatus later to be described.

Figure 4:
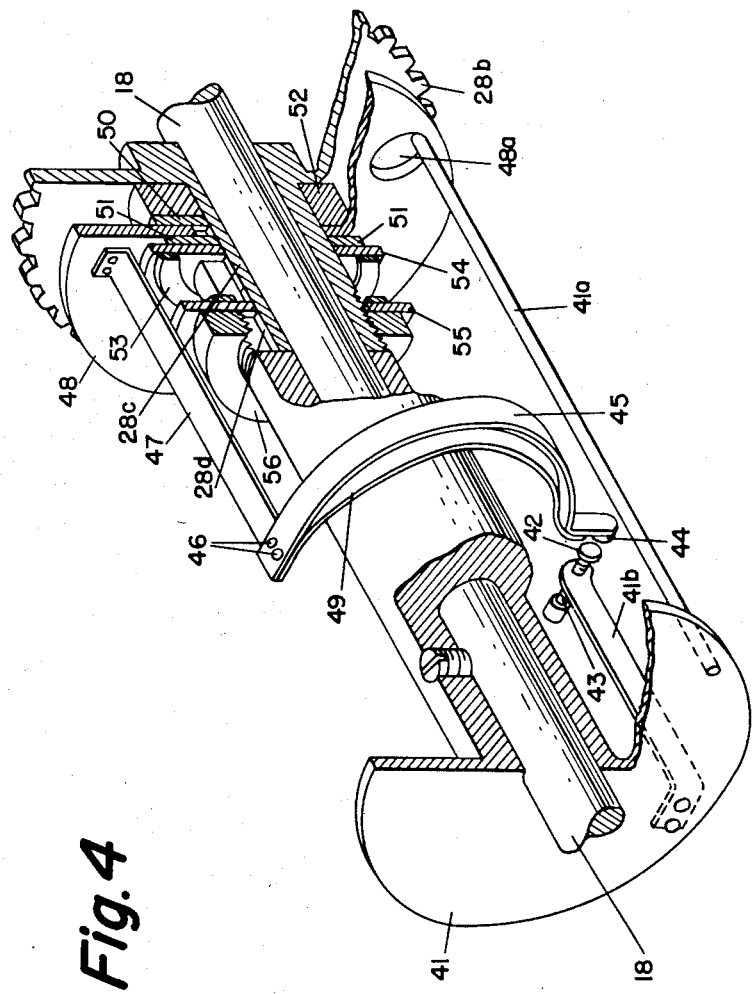
Fig. 4 is a perspective view, partly in section and partly exploded, of a third embodiment which may be employed in accordance with the invention.

In accordance with the modification of Fig. 4 certain additional advantages are achieved. The slidewire shaft 18 carries a disc 41 from which there extends an arm 41a and also a switch arm 41b on which a switch contact 42 is adjustably carried by a threaded support 43. A contact 44 is carried at the end of a resilient arcuate switch member 45 secured as by rivets 46 to a switch arm or member 47 which is, in turn, secured to a frictionally driven disc 48. A rigid arcuate member 49 forms the stop for the resilient switch member 45 which is biased toward the downturned end of member 49 and toward the contact 42. In the modification of Fig. 4 it is to be observed that the slidewire shaft 18 supports the entire control mechanism, the gear 28b being journaled upon slidewire shaft 18 and free to rotate independently thereof. The gear 28b has a cylindrical extension 28c with a flattened portion 28d and by means of which a driving connection is made for the several discs and excluding the disc 48. Thus, upon rotation of gear 28b two friction discs 50 and 51 are rotated to develop a frictional driving force on the disc 48. The disc 51 is pressed against disc 48, towards disc 50 and towards a collar 52 by means of a coil spring 53 acting against a disc 54, the opposite end of the coil spring bearing against an adjustable disc 55. The axial position of disc 55 can be varied by rotating an internally threaded collar 56 mounted upon the end of the cylindrical extension 28c.

As long as the slidewire shaft 18 and disc 41 are rotating in a clockwise direction at a speed greater than the gear 28b and the disc 48, contacts 42 and 44 are separated a distance determined by the setting of the adjustable support 43 and by the size of the opening 48a in disc 48. As the speed of disc 41 decreases, the switch member 45 is rotated to bring the contact 44 toward the contact 42 to complete a circuit as the thermocouple attains the temperature of the object whose temperature is under measurement. The ease of adjustment, the reliability in operation, and the compactness of the modification of Fig. 4 make it the preferred mechanical embodiment of the invention.

While the foregoing modifications of the invention have been described primarily for their use with measuring systems of the network-balancing type where an electrical motor positions a slidewire to rebalance the measuring network, it is to be understood that each modification of the invention may also be used with other forms of balancing systems, and there may be used other forms of balancing mechanisms such as the mechanical relay mechanism known to those skilled in the art under the trade-name "Micromax," one form of such mechanism being disclosed in Squibb Patent No. 1,935,732, and diagrammatically in Fig. 1–A. Where rebalancing mechanisms of the mechanical relay type are utilized, the operation is characterized by intermittent operation of the slidewire 14, the extent of rotation within limits being proportional to the magnitude of the unbalance voltage. Thus, as the temperature of the thermocouple rises, the slidewire 14 is moved under the control of a galvanometer 34, feelers 57 and 58, clutch member 59, clutch disc 60, and cams 61 and 62 driven by a motor 63. The movement is by a series of relatively large steps, and as balance of the network is attained the steps grow smaller and smaller. The net result is that there is an average rate of movement of the slidewire which is initially large and which thereafter gradually decreases. Accordingly, if as in Fig. 1, the vertical spacing across the opening in member 32 carried by shaft 18 of Fig. 1–A be of the right size relative to the speed of movement of the arm 31a and such as to require about two operations of the mechanical relay to advance the slidewire by relatively small amounts, a reliable signal will be had as to the attainment by the thermocouple of the final temperature. In other words, with relatively large adjustments of the slidewire and with those of lesser size adequate to produce an average speed of the switch arm 32a adequate to maintain the contacts in open-circuit position, the contact 31b will not approach and touch contact 32b until a sufficient number of small adjustments of the slidewire have been produced as will assure a correct signal that the record on the chart represents an accurate measurement of the temperature of the molten bath or other object to which the thermocouple is to respond.

Figure 5:
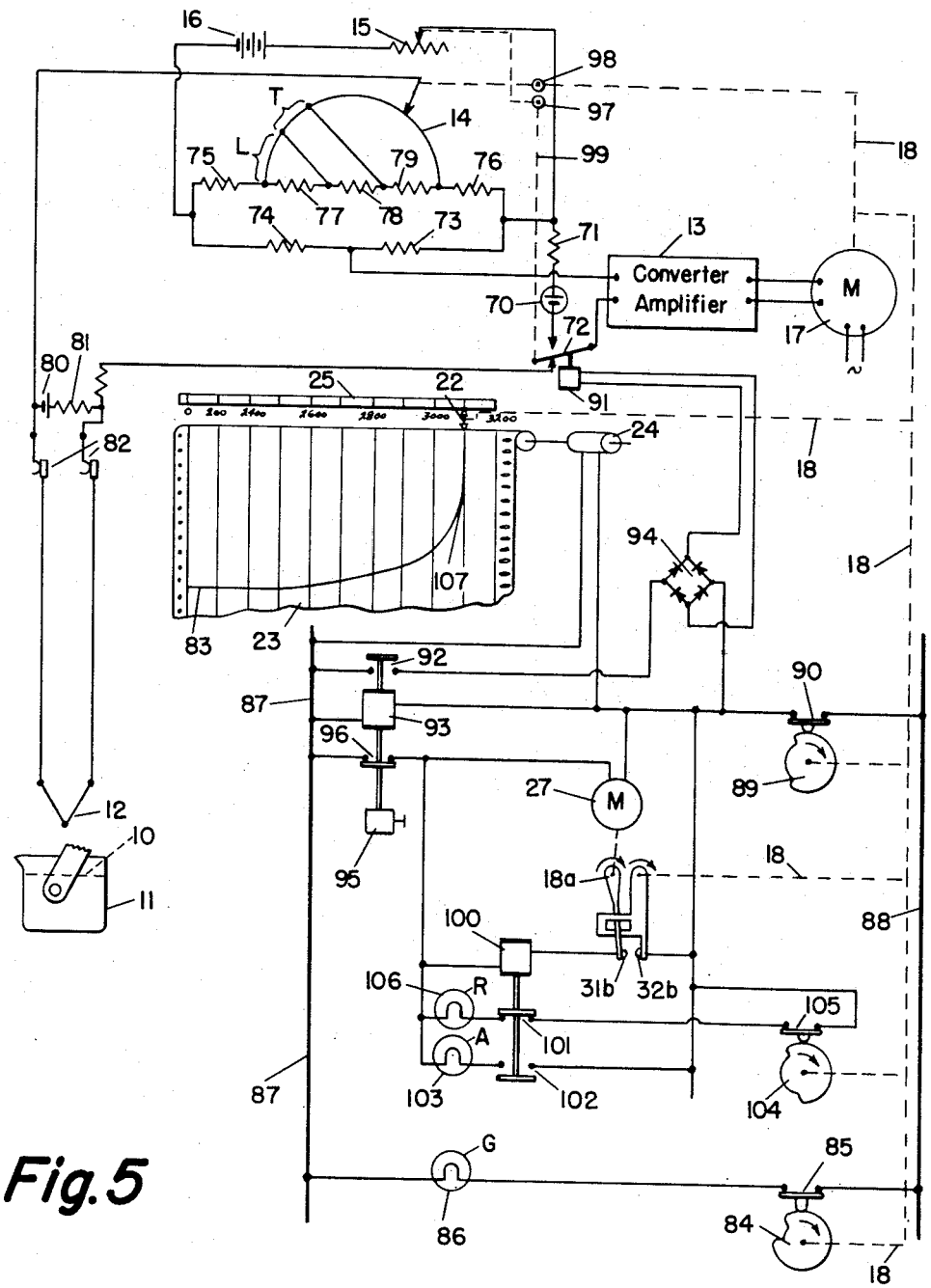
Fig. 5 is a schematic wiring diagram which may include any one of the aforesaid embodiments.

Referring now to Fig. 5, the measuring system illustrated is similar to the one shown in Fig. 1, and corresponding reference numerals have been applied to corresponding parts. The balanceable network has been shown in somewhat greater detail and as including a standardizing circuit including a standard cell 70, a relatively high resistance 71 in series therewith, and a standardizing switch 72 illustrated in the measuring position and operable to its other position to connect the standard cell into the input circuit of the converter-amplifier 13. If the potential of the standard cell 70 is not equal and opposite to the potential difference across the resistor 73, the rheostat 15 is adjusted until rebalance is restored. The measuring network will then be properly calibrated or standardized for the accurate measurement of temperature to which the thermocouple 12 may be subjected. Those skilled in the art well understand the purpose of resistors 74—76 and their function need not here be described in detail. A description thereof will be found in Wunsch Patent No. 1,199,724. Inasmuch as the temperatures to which the thermocouple 12 may be subjected vary from room temperature to temperatures from 2,000° F. and above, it is necessary either to include range-changing provisions in the circuit or, as illustrated, to provide on the same slidewire 14 different ranges of potential differences corresponding to different temperature ranges of operation of thermocouple 12. Thus, by connecting the resistors 77—79 across sections of the slidewire 14 the range of potential difference at the low end of the scale indicated by the bracket L may correspond with the temperature range of 0 to 200°; a second section will correspond with a transition range T, and the remaining portion of slidewire 14 will correspond with a range of temperature of from 2400° F. to 3200° F. It is to be understood that the foregoing ranges are given as exemplary and that any two widely separated ranges can be utilized depending upon the requirements and the particular thermocouples selected for the application. The selection of the type of thermocouple and a particular resistance of slidewire 14 will determine the values of resistors 77—79.

As in Fig. 1 the motor 17 is illustrated as including four conductors leading to it, only two of them in Fig. 5 being illustrated as coming from the converter-amplifier. Those conductors would ordinarily energize the control winding of the motor, the power winding being energized from an alternating-current source of supply, as symbolically illustrated. While the operation of the remainder of the system in general is similar to the modification of Fig. 1, there have been added a number of additional control features deemed of advantage.

Inasmuch as the life of the condition-responsive device, such as the thermocouple 12, is limited by the integration of its times of immersion in the molten bath 10, it is desirable always to have at hand a convenient means of checking the operativeness of the thermocouple before initiating the measuring operation. As a part of such provisions there may be included a "fail-safe" circuit across the thermocouple circuit comprising a battery 80 and a resistor 81 of high resistance. If the thermocouple 12 becomes open-circuited, or in case the thermocouple circuit 12 is disconnected from the measuring circuit as by the plug-and-jack connections 82, the battery 80 applies to the input circuit of the converter-amplifier 13 a voltage of polarity which causes the motor 17 to move the indicator pen 22 against the low end of the chart corresponding with a temperature less than that of the surroundings, for example 0° F.

To initiate the measuring cycle the thermocouple 12 is connected by the plug-and-jack connections 82 to the measuring circuit, the connections 82 being provided for ease in handling the thermocouple and in particular for the application to the thermocouple of a quartz tip which affords some protection and extends its life in use. Immediately upon connection of thermocouple 12 to the measuring circuit, the "fail-safe" circuit is rendered ineffective and the thermocouple applies to the input circuit of the converter-amplifier a potential difference representative of room temperature. The unbalance signal causes the motor 17 to be energized in a direction to move the pen 22 upscale where it will come to rest somewhere in the vicinity of the lead line from reference character 83. The movement of the pen 22 and its associated indicator to indicate room temperature will signal to the operator that the thermocouple 12 is operative since if it were open-circuited, the motor 17 would not be energized to move the pen 22 away from the lower end of the scale so as to indicate room temperature, and if the thermocouple 12 were short-circuited, the pen 22 would remain at its position at the low end of the scale. By providing a cam 84 on the slidewire shaft 18 arranged to close contacts 85 as the pen 22 is moved to a temperature somewhat below room temperature, as for example 50° F., a signal lamp 86 is energized from a circuit extending between supply lines 87 and 88. The signal lamp 86 can be green representing a go-ahead signal. The circuit for lamp 86 is opened by cam 84.

After determining that the thermocouple 12 is in operative position, as just explained, the operator then immerses the thermocouple in the molten metal 10. Obviously, the temperature of thermocouple 12 rises very rapidly and the pen 22 is driven across the chart 23. The trace of its movement remains horizontal because the motor 24 driving the chart during the described period has not yet been energized.

As the temperature reaches a predetermined elevation, above the low rang L of slidewire 14 and above the transition range T, a cam 89 closes contacts 90 to complete two circuits. The first energizes a solenoid 91 to operate the transfer switch 72 from its measuring position to its standardizing position. The circuit may be traced from supply line 87 by way of contacts 92 of a relay 93, full-wave rectifier 94, solenoid 91, and by way of contacts 90 to the other supply line 88. The other circuit completed by contacts 90 is for the operating coil of relay 93 which by any suitable means, such as a dashpot 95, opens contacts 92 and closes contacts 96 after an interval of time of the order of a second or two, which is adequate for the completion of the standardizing operation. The standardizing itself is accomplished by motor 17 driving rheostat 15 through a mechanical connection diagrammatically illustrated by the movement of a driving disc 97 into driving engagement with a disc 98 carried by slidewire shaft 18 for movement of rheostat 15, the driving disc 97 being operable into engagement with disc 98 by the mechanical link indicated by the broken line 99.

After the standardizing operation is completed, relay 93 opens contacts 92 to deenergize solenoid 91 and completes a circuit, through contacts 96, for the motor 27 which then rotates contacts 31b in a clockwise direction about an axis 18a of rotation coinciding with the axis of rotation of slidewire shaft 18. It is to be observed that contacts 32b in Fig. 5 have been illustrated as rotating in a clockwise direction when shaft 18 is rotating in a direction to move the pen 22 upscale. Thus, as soon as the pen is moved from its zero-scale position, contacts 32b are moved into engagement with contacts 31b and that contact 31b is bodily rotated about axis 18a by reason of the frictional connection previously described in the several modifications of the invention already explained at length.

Notwithstanding that motor 27 is energized, it will be recalled that the circuit through contacts 31b and 32b remains closed until the speed of slidewire shaft 18 falls below that of contact 31b. From the foregoing, it will be seen that besides energizing the motor 27 the closure of contacts 96 also energizes the operating coil of a relay 100, which thereupon opens its contacts 101 and closes its contacts 102 to complete an energizing circuit for a signal lamp 103 which may be of amber color to signal to the operator that standardizing of the measuring circuit has been completed and that the measurement is proceeding.

At a temperature of the order of 2600° F., or one above the temperature which may be selected for standardizing operations, as for example 2450° F., a cam 104 is arranged to close contacts 105 partially to complete an energizing circuit for a signal lamp 106 which may be of red color to signal to the operator that the measuring operation has been completed. Contacts 105 only partly complete the energizing circuit for the red signal lamp 106. The circuit is completed after the speed of slidewire shaft 18 has decreased below the speed of rotation of motor 27 and of contact 31b by an amount such that the contact 31b is moved out of engagement with the contact 32b. When the contacts separate, the energizing coil of relay 100 is deenergized, and upon closure of contacts 101 the red signal lamp 106 is energized to signal the operator he can immediately remove thermocouple 12 from the molten bath 10. The red signal lamp 106 is energized in the region indicated by the lead line from reference character 107, and as the pen 22 has been moved into its final position corresponding on the chart and with respect to the scale 25 corresponding with the temperature of the molten bath 10. Of course, the amber signal lamp 103 is extinguished by the opening of contacts 102. Thus, the system of Fig. 5 automatically signals to the operator the progress of the measurement when he may without delay or exercise of judgment safely remove the thermocouple from the molten bath with the assurance the system has accurately recorded on the chart the temperature of the molten bath.

With the explanation given as to the requirements of the invention, those skilled in the art will immediately understand that the dimensioning of the parts will be determined by the particular mechanisms utilized. In one modification of the invention where the balancing motor 17 was capable of driving the pen 22 from one side of the chart to the other in approximately three seconds, the height or vertical distance of the slot in the member 32, as viewed in Fig. 1, was made such that it required about one second for the arm 31a to be moved from one edge of the opening to the other edge of the opening with the arm 32a at standstill. Where the mechanical relay type of mechanism is utilized, a corresponding time of movement of the arm 31a would be made of the order of three seconds. Thus, it will be seen that the particular ratio of gearing 28a and the like may vary considerably in order to meet the design requirements here specified as exemplary of two forms of the invention, all within the teachings hereof.

While a preferred embodiment of this invention has been illustrated, it is to be understood that other modifications thereof may be made within the scope of the appended claims.

What is claimed is:

1. In a system of temperature measurement including a temperature-responsive element, the combination of means for moving said element in heat exchange relation with a high temperature mass whose temperature is to be measured, a balanceable network including connections for said element which when subjected to temperature change tends to unbalance said network, said network including an adjustable circuit component movable in a network-balancing direction, means including a detector responsive to unbalance of said network for adjusting said circuit component at a speed related to the rate of change of temperature of said element and in a network-balancing direction, the speed of adjustment of said component being gradually reduced as network balance is approached, a first control member, means for driving said first control member as a relatively low constant speed and one which is comparable to the speed of adjustment of said circuit component as network balance is approached, a second control member disposed in cooperative relation with said first control member, means for driving said second control member at a speed related to that at which said circuit component is adjusted, a mechanical connection between said control members through which said second member engages said first member and is disengaged therefrom when the speed of said second member decreases below that of said first member, frictional driving means between one of said members and its driving means to permit relative adjustment between them when said second member is moved at a speed greater than said first member, and means operable when the speed of said first member exceeds that of said second member for completing a signaling circuit indicative that said temperature-responsive element has attained a final temperature and said balanceable network has been balanced, removal by said means of said element from its heat exchange relation with said mass lowering the temperature of said element for reversal of unbalance of said network and for reversal of adjustment of said circuit component and of said second element to move said first element in a reverse direction preparatory to a second temperature-measuring operation by said element.

2. A measuring system comprising a condition-responsive element, means for exposing said element to a condition, the magnitude of which is to be measured, a balanceable network including connections for said element which when subjected to said condition tends to unbalance said network, said network including an adjustable circuit component movable in a network-balancing direction, means including a detector responsive to unbalance of said network for adjusting said circuit component at a speed related to the rate of response of said element to the magnitude of said condition and in a network-balancing direction, the speed of adjustment of said component being gradually reduced as network balance is approached, a first control member, means for driving said first control member at a relatively low constant speed and one which is comparable to the speed of adjustment of said circuit component as network balance is approached, a second control member disposed in cooperative relation with said first control member, means for driving said second control member at a speed related to that at which said circuit component is adjusted, a mechanical connection between said control members through which said second member engages said first member and is disengaged therefrom when the speed of said second member decreases below that of said first member, frictional driving means between one of said members and its driving means to permit relative adjustment between them when said second member is moved at a speed greater than said first member, a pair of control contacts, and means operable when the speed of said first member exceeds that of said second member for operating said contacts to indicate that said condition-responsive element reflects the magnitude of said condition and that said balanceable network has been balanced, response of said element to its movement out of exposure to said condition reversing the unbalance of said network for reversal of adjustment of said circuit component and of said second element to move said first element in a reverse direction preparatory to a second condition-measuring operation by said element.

3. In a system of temperature measurement including a thermocouple, the combination of means for moving said thermocouple into a high-temperature molten bath whose temperature is to be measured, a balanceable network including connections for said thermocouple which when subjected to temperature change introduces a voltage unbalance into said network, said network including an adjustable slidewire moveable in a network-balancing direction to introduce into said network a balancing voltage, means including a detector responsive to voltage unbalance of said network for adjusting said slidewire at a speed related to the rate of change of temperature of said thermocouple and in a network-balancing direction, the speed of adjustment of said slidewire being gradually reduced as network balance is approached, a first contact arm, means for driving said first arm at a relatively low constant speed and one which is comparable to the speed of adjustment of said slidewire as network balance is approached, a second contact arm disposed in cooperative relation with said first contact arm, means for driving said second contact arm at a speed equal to that at which said slidewire is adjusted, a mechanical connection between said contact arms through which said second arm engages said first arm and is disengaged therefrom when the speed of said second arm decreases below that of said first arm, frictional driving means between one of said arms and its said driving means to permit relative adjustment between them when said second arm is moved at a speed greater than said first arm, and means including a pair of control contacts respectively carried by said arms and operable when the speed of said first arm exceeds that of said second arm for indicating that said thermocouple has closely approached the temperature of said bath and that said balanceable network is practically at balance, removal by said means of said thermocouple from said bath lowering the temperature of said thermocouple which reverses the unbalance of said network, with reversal of movement of said slidewire and of said second arm to move said first arm in a reverse direction relative to its driving means preparatory to a second temperature-measuring operation of a molten bath by said thermocouple.

4. The combination set forth in claim 3 in which there is provided a signaling means indicative of a low thermocouple temperature, an energizing circuit closed by said means including said detector upon attainment of said low temperature after removal of said thermocouple from said bath, and additional signaling means operable under the control of said pair of contacts, one of said signaling means indicating that said second arm is moving at a speed greater than said first arm, and the other of said signaling means indicating that said second arm is moving at a speed lower than said first arm.

5. The combination set forth in claim 3 in which said means including said detector is provided with a shaft for adjustment of said slidewire, said driving means for said first arm comprising a first driving member journaled upon said slidewire shaft for rotation independently thereof and to which said first contact arm is secured, said means for driving said second contact arm comprising a second driving member rotatable with said shaft and supporting said second contact arm, a member interconnecting said first and second driving members through a lost-motion connection for predetermining the separation distance between said contact arms upon rotation of one of said driving members at a speed greater than the other, said first driving member being rotatable at a relatively low constant speed, a change in relative speeds which reverses their relative magnitudes as between said first and second driving members varying the separation distance between said contacts in one direction or the other depending upon which driving member is rotating at the greater speed, frictional driving discs disposed in frictional engagement with said first driving member, and means for rotating said discs at said relatively low speed for driving said first driving member at a corresponding low speed, with slippage between said first driving member and said discs when the lost motion of said mechanical connection has been fully taken up in one direction.

6. In a control system the sub-combination of a circuit-controlling device comprising a shaft, a first driving member journaled on said shaft and rotatable independently thereof, a first contact arm supported by said driving member, at least one friction disc engaging said driving member, means for rotating said friction disc at a relatively low constant speed for frictionally driving said first driving member at a correspondingly low speed, a second driving member secured to and rotatable with said shaft, a second contact arm carried by said second driving member and extending into cooperative relation with said first contact arm, contacts respectively carried by said contact arms and movable thereby into and out of circuit-controlling relationships, a mechanical driving connection between said driving members and including a lost-motion driving connection for relative movement by a predetermined amount of one with respect to the other which establishes a predetermined separation distance between said contact arms and the contacts carried thereby, and means for driving said shaft at speeds above and below said relatively low speed for relative movement of said contact arms to open and close the circuit through said contacts, said mechanical connection and said frictional drive for said first driving member changing said circuit-controlling relationship of said contacts whenever the speed of said shaft increases above or falls below that of said predetermined low speed.

References Cited in the file of this patent

UNITED STATES PATENTS

| Number | Name | Date |
|---|---|---|
| 2,089,878 | Corbin | Aug. 10, 1937 |
| 2,217,254 | Langasser | Oct. 8, 1940 |
| 2,292,063 | Dome | Aug. 4, 1942 |
| 2,344,116 | Ullman | Mar. 14, 1944 |
| 2,398,341 | Wills | Apr. 9, 19946 |
| 2,400,018 | Olah | May 7, 1946 |